United States Patent Office 3,330,789
Patented July 11, 1967

3,330,789
LINEAR POLYMERIC POLYESTER VINYL RESIN PLASTICIZERS AND PLASTICIZED COMPOSITIONS
Robert D. Aylesworth and Clarence F. Huber, Cincinnati, Ohio, and Harold C. Foulks, Jr., Newport, Ky., assignors to Emery Industries, Inc., Cincinnati, Ohio, a corporation of Ohio
No Drawing. Filed June 6, 1963, Ser. No. 285,887
6 Claims. (Cl. 260—22)

This invention relates to the provision of a novel plasticizer composition of the polymeric type particularly adapted for use in polyvinyl chloride resins, and to the resulting plasticized resin compositions. This application is a continuation-in-part of our copending application, Ser. No. 132,293 filed Aug. 18, 1961, now abandoned.

Polyvinyl resins are manufactured by polymerizing vinyl chloride monomer either alone or in admixture with small proportions of other monomers such as vinyl acetate or vinylidene chloride, for example. For the purpose of the present invention, any reference to a polyvinyl chloride resin (PVC) refers to the family of polymers so produced, whether by the homopolymerization of vinyl chloride or by the copolymerization thereof with other polymerizable monomers. Processing of these polymers, to provide the finished end product, is accomplished by the application of heat, usually under pressure. In general, the resin products so obtained are hard, tough, and usually brittle materials which by themselves are not particularly useful. However, these deficiencies are overcome by compounding the polymer starting material with a substantial proportion of a plasticizer which acts to soften the finished product while imparting other favorable physical characteristics thereto such as improved flexibility and elasticity, toughness and strength. However, many other product characteristics must also be kept in mind, and the problem faced in the art has been to provide a plasticizing composition which will effect a desired improvement in the physical characteristics of the PVC resin, while at the same time giving a product having a high degree of permanence both as regards attack by various solvents as well as from the standpoint of decomposition or deterioration on exposure to heat and light.

It is a primary object of this invention to provide a plasticizer which can be incorporated into polyvinyl resins to produce plastic compositions displaying permanently the desired qualities of strength, flexibility and softness to a degree not heretofore possible with other plasticizers presently available.

A further and more particular object is to provide a plasticized resin composition of the foregoing character having excellent electrical properties and affording a high degree of resistance to the passage of electrical current therethrough.

A further object is to provide plasticized polyvinyl resin compositions which, when cured, do not manifest plasticizer spew or migration, which possess outstanding resistance to extraction by soapy water, hydrocarbons or other solvents and which have little tendency to mar and disfigure the surface of other materials with which they may come into contact such as nitrocellulose or styrene based plastics.

Another object is to provide a plasticized polyvinyl resin having the above characteristics which is extremely resistant to decomposition and discoloration under the influence of heat and light.

The present invention is based on the discovery that the foregoing and other objects of this invention can be achieved by the use of a novel polymeric plasticizing composition having a molecular weight of from about 700 to 5000 which is prepared by esterifying a reaction mixture incorporating the following ingredients:

(a) a glycol component consisting of neopentyl glycol and optionally at least one other glycol selected from the group consisting of ethylene glycol, propylene glycol and 1,3-butanediol, the amount of neopentyl glycol present being equivalent to at least 50% of that required to esterify all the acids in the mixture;
(b) an aliphatic monocarboxylic acid component comprised of alkanoic acids of from 7 to 18 carbon atoms in the molecule;
(c) an aliphatic dicarboxylic acid component comprised of alkanedioic acids containing from 6 to 13 carbon atoms in the molecule; and
(d) an aromatic dicarboxylic acid component selected from the group consisting of phthalic, isophthalic and terephthalic acids and of the anhydrides of said acids, said aromatic acid comprising from 5 to 60 mole percent of the total dicarboxylic acid content of the reaction mixture.

The above reactants should be employed in the ratio of 2 moles of the monocarboxylic acid component to from about 2 to 15 moles of the total aliphatic and aromatic dicarboxylic acid components, and to a number of moles of the glycol component at least equal to one more than the total number of moles of the dicarboxylic acid components. The usual practice is to employ an excess of the glycol component over this minimum molar amount, which excess is distilled off as the esterification reaction is driven to completion.

The polyester products so formed are linear esters and have, in general, the following formula, it being recognized that the particular plasticizing composition formed in any given instance will be a mixture of several compounds:

$$MA—G—(DA—G)_x—MA$$

wherein each MA represents a monocarboxylic acid molecule ester-linked to an adjacent glycol molecule as represented by G, and where DA represents a dicarboxylic acid molecule (some being aliphatic in character and others aromatic) similarly ester-linked to adjacent glycol molecules. The symbol $x$, for any given compound, represents an integer having a value of from about 2 to 15, but in view of the fact that a given composition is made up of several compounds, $x$ may have an empirical value, as regards the overall composition, which is not a whole integer.

Esterification and reaction of the components to obtain the desired resinous plasticizer is carried out in accordance with conventional esterification procedures. For example, the necessary components, selected in accordance with the polymer structure desired in the plasticizer, are charged into a suitable reaction vessel and heated at atmospheric pressure at temperatures of the order of about 150 to 250° C. for a period of time sufficient to substantially complete esterification, good yields normally being obtained with a heating period of from about 2 to 6 hours. The reaction may be forced to completion by distillation in vacuo (typically 2–50 mm. Hg abs. at 200–250° C.) until a suitably low acid value such as 0.5 to 10 is obtained. Where a plasticizer of extremely low volatility is desired, the small amounts of low-boiling ester formed by reaction of the glycol with only the monobasic acid may be removed by distillation at even lower pressures for a suitable length of time. It has been found that absolute pressures of 1 to 10 mm. mercury, at temperatures of 200–260° C. for two hours, are generally sufficient to accomplish removal of the more volatile glycol esters. The plasticizer is then cooled and is normally ready for use.

If an improvement in color is desired, the product may be bleached by any one or more of the well known and accepted bleaching agents which are commonly used to lighten the color of plasticizers and esters and it can be filtered through a filter aid, charcoal or bleaching clay for further clarification.

Esterification may be facilitated by the use of suitable esterification catalysts, such as phosphoric acid, paratoluene sulfonic acid, stannous oxalate, and an alkyl titanate ester or a similar catalyst in small percentages. The catalyst may be deactivated or removed by filtering or other conventional treatment after the esterification is completed. The polyester can also be made by using an ester of the corresponding dibasic acid or the monobasic acid, in which case the polymer is built up through a transesterification reaction. A combination of transesterification and direct esterification can also be used to incorporate the different acids into the polymer chain.

The ratio of monobasic to dibasic acids is very important since this proportion will control the average molecular weight of the polyester. Because a mixture of dibasic acids is used, the proportion of aromatic acids to aliphatic dibasic acids will control the arrangement of the molecular species in the chain and will add to the diversity of the types of molecules present. The arrangement of aromatic molecules throughout the polymer chain will be at random and may differ as between particular polyester molecules each having the same number of component, dibasic acid molecules.

The monobasic (alkanoic) acids employed in forming the polyester plasticizer of the present invention are of aliphatic character, are branched or straight chain, saturated or unsaturated, and they contain from about 7 to 18 carbon atoms in the molecule. Representative acids suitable for use in practicing the invention are heptanoic, caprylic, pelargonic, capric, undecylic, lauric, myristic, palmitic, stearic, oleic, ethylhexoic and isodecanoic acids. Mixtures of these acids can also be employed, representative mixed acid starting materials being those derived on the splitting of coconut oil or tallow. It is also possible to use synthetic monobasic acids derived from oxidized petroleum or from products obtained from the oxo process. Particularly good results have been obtained in preparing the polyesters of this invention by the use of lauric, myristic, palmitic and stearic acids. Said acids may be used either in the relatively pure form or as a commercial grade, commercial stearic acid, for example, being essentially a mixture of palmitic and stearic acids, while commercial palmitic acid contains minor proportions of myristic and stearic acids.

The dibasic acids used in forming the polyester plasticizer are, as stated above, of both aliphatic and aromatic character. The aromatic acids which may be employed comprise phthalic acid, isophthalic acid, terephthalic acid and their various anhydrides. Phthalic anhydride constitutes the preferred aromatic acid component for use in forming the polyester plasticizer compositions of this invention. The aliphatic dicarboxylic acids which may be employed are those (alpha, omega-alkanedioic acids) which contain from 6 to 13 carbon atoms in the molecule as represented by adipic, pimelic, suberic, azelaic, sebacic and brassylic acids, as well as the anhydrides of said acids.

The glycol or dihydric alcohol employed in forming the polyester is neopentyl glycol or it is a mixture of neopentyl glycol with one or more of the glycols from the group consisting of ethylene glycol, propylene glycol, and 1,3-butanediol. The amount of neopentyl glycol in the mixture should be equivalent to that quantity required to esterify at least 50% of all the acids in the mixture. As a consequence one-half or more of the glycol units in the polymer chain are derived from neopentyl glycol. Particularly good results have been obtained with all neopentyl glycol and mixtures containing neopentyl glycol equivalent to 90% of the total acids with ethylene glycol or propylene glycol. When employing an excess of glycol over the quantity theoretically required to fully esterify the acids present for the purpose of driving the esterification to completion, the excess may consist of ethylene glycol, propylene glycol, 1,3-butanediol or any mixture thereof. These glycols are lower boiling than neopentyl glycol and are later removed during the stripping operation. Hence, their use (in excess) does not materially affect the makeup of the plasticizer molecule.

EXAMPLES I–XXII

In order to point out more fully and to better describe the nature of the present invention, a series of examples are presented below in Tables I and II which either illustrate the invention in various of its embodiments (Examples II, III, IV, VI, VII, VIII, IX, XI, XII, XVI, XVII, XIX, XX, XXI, and XXII) or present comparative data as regards compositions which fall outside the scope of the invention (Examples I, V, X, XIV, XV, and XVIII). The manner in which the polyester plasticizers forming the subject of the examples were prepared can be illustrated by the precise method used with the Example IV product, said preparation being as follows:

A polyester plasticizer having a molecular weight of approximately 2114 was prepared using a mixture of the following materials:

| | Parts |
|---|---|
| 3.9 moles azelaic acid | 714 |
| 2.1 moles phthalic anhydride | 311 |
| 2.0 moles myristic acid | 556 |
| 9.0 moles neopentyl glycol | 832 |
| Dibutyl tin oxide catalyst | 0.75 |

With respect to the general polyester formula discussed above, $x=6$ for the polyester here exemplified; that is, the average number of dibasic acid units in the molecule is six. With respect to the proportions of the respective dibasic acids in the molecule, 35 mole percent is aromatic dibasic acid and 65 mole percent is an aliphatic dibasic acid. The amount of glycol employed represents a 28% excess over the theoretical quantity of 7.0 moles required to form the polyester, the excess being used to help promote complete esterification and thereafter being removed during the later stages of the esterification process. The esterification was carried out by charging the above materials into a three-necked, round-bottom flask equipped with a suitable agitator, a thermometer and a medium length Vigreaux distillation column and condenser. The condenser and column were arranged so that material could be distilled from the reaction mixture at either atmospheric or reduced pressure. The mixture was esterified by slowly heating the contents of the reaction flask to approximately 250° C., while the water formed was slowly distilled out through the column. The temperature was held at this level, at atmospheric pressure, until the reaction slowed down materially as evidenced by a reduced rate of water evolution. When this point was reached, the mixture was subjected to distillation under reduced pressure to help complete the reaction and to remove the excess neopentyl glycol. Specifically, the pressure was reduced gradually by use of a vacuum pump, with the temperature at 220–250° C., at such a rate that a controlled distillation of volatile materials took place, a final pressure of 2 mm. Hg. (at 250°–260° C.) being finally reached.

The progress of the esterification was followed by determining the acid value, while the amount of excess glycol removed was measured by means of hydroxyl value determinations. When the acid value reached a level below 2.0 and the hydroxyl value a level below 20, the reaction was considered complete. The esterification mixture was then cooled to room temperature and filtered. The resulting product was a clear, amber-colored liquid which was somewhat viscous and had a very low volatility. This liquid was evaluated as a plasticizer without further processing or modification.

Following the procedure as described above, other polyester plasticizers were prepared in which the only variations made were in the nature and proportions of the aliphatic and aromatic dibasic acids. Referring to Table I below, in Examples I–IX the value of $x$ was kept at 6, while in Examples X–XIV the value of $x$ was raised to 9. In Examples XV–XXII, Table II, the value of $x$ was lowered to 3. Further, in the case of Example XIII preparation, the acid value of the product was relatively high, i.e., about 4, whereas with the other products the acid value was maintained at a level below 2. These groups of polyesters, (together with that described above, Example IV) are listed below in Tables I and II along with data as to the nature and proportions of the dibasic acids employed, the molecular weight of the polymer and the viscosity thereof.

where Y represents the parts of plasticizer per hundred parts of resin (phr.). Hereafter the plasticizer concentration will be referred to in terms of said phr. value. The Geon 101 is a B. F. Goodrich Chemical Company product made up of straight, polyvinyl chloride. The stabilizers are products of the Ferro Products Company which are conventionally incorporated to prevent decomposition of the polyvinyl chloride. That designated as 903 is an aryl phosphite, while 1820 is a barium-cadmium salt of lauric acid.

To incorporate the plasticizer into the resin, a blend of materials of the previous PVC formula along with the chosen quantity of plasticizer (using the products of Tables I and II) was milled on a two-roll rubber mill at

TABLE I

| Example No. | Moles-Aromatic Dibasic Acid | Moles-Aliphatic Dibasic Acid | Mole Percent* Aromatic Dibasic Acid | Mol. Wt. | Viscosity, Cps. at 210° F. |
|---|---|---|---|---|---|
| I | None | 6.0, Azelaic | 0 | 2,160 | 78.4 |
| II | 0.3, Phthalic | 5.7, Azelaic | 5 | 2,153 | 102.9 |
| III | 1.2, Phthalic | 4.8, Azelaic | 20 | 2,134 | 94.0 |
| IV | 2.1, Phthalic | 3.9, Azelaic | 35 | 2,114 | 117.8 |
| V | 3.0, Phthalic | 3.0, Azelaic | 50 | 2,094 | 152.0 |
| VI | 1.2, Isophthalic | 4.8, Azelaic | 20 | 2,134 | 141.0 |
| VII | 1.2, Phthalic | 4.8, Adipic | 20 | 1,932 | 96.0 |
| VIII | do | 4.8, Sebacic | 20 | 2,201 | 105.5 |
| IX | 2.1, Phthalic | 3.9, Sebacic | 35 | 2,168 | 146.0 |
| X | None | 9.0, Azelaic | 0 | 2,828 | 113.0 |
| XI | 0.45, Phthalic | 8.55, Azelaic | 5 | 2,818 | 191.0 |
| XII | 1.8, Phthalic | 7.2, Azelaic | 20 | 2,788 | 221.0 |
| XIII | 3.0, Phthalic | 6.0, Azelaic | 33 | 2,762 | 153.5 |
| XIV | 4.5, Phthalic | 4.5, Azelaic | 50 | 2,729 | 405.0 |

* Represents mole percent of the total dibasic acid only.

TABLE II

| Example No. | Moles-Aromatic Dibasic Acid | Moles-Aliphatic Dibasic Acid | Mole Percent* Aromatic Dibasic Acid | Mol. Wt. | Viscosity, Cps. at 210° F. |
|---|---|---|---|---|---|
| XV | 0.15, Phthalic | 2.85, Adipic | 5 | 1,169 | 254 |
| XVI | 0.75, Phthalic | 2.25, Adipic | 25 | 1,182 | 296 |
| XVII | 1.5, Phthalic | 1.5, Adipic | 50 | 1,196 | 727 |
| XVIII | 2.25, Phthalic | 0.75, Adipic | 75 | 1,210 | 1,885 |
| XIX | 1.5, Phthalic | 1.5 Azelaic | 50 | 1,259 | 646 |
| XX | 1.5, Isophthalic | do | 50 | 1,259 | 1,650 |
| XXI | do | 1.5, Adipic | 50 | 1,196 | 1,253 |
| XXII | 1.5, Phthalic | 1.5, Sebacic | 50 | 1,280 | 842 |

* Represents mole percent of the total dibasic acid only.

The outstanding and unexpected improvements that are obtained from the polyester plasticizers described in this invention can be readily illustrated through tests on PVC resins which have been plasticized with said polyesters. In order to carry out such tests, the plasticizers were incorporated into polyvinyl chloride using the following general formulation:

| | Parts |
|---|---|
| Polyvinyl chloride—Geon 101 | 100 |
| Ferro 903 stabilizer | 1 |
| Ferro 1820 stabilizer | 2 |
| Polyester plasticizer | Y |

170° C. for five minutes. The plasticized material was removed in the form of a sheet of approximately 0.025 inch thickness. Portions of these sheets were then pressed in molds at 177° C. to produce sheets 0.075 inch and 0.020 inch thickness, which were uniform and clear. Samples were then cut from these sheets to evaluate the product. The preparation of plasticized polyvinyl chloride sheets to be used to evaluate the plasticizer can best be illustrated with the following specific example.

The following materials were blended together in a 600 ml. stainless steel beaker by hand mixing with a spatula:

| | Grams |
|---|---|
| Polyvinyl chloride—Geon 101 | 100 |
| Ferro 1820 stabilizer | 2 |
| Ferro 903 stabilizer | 1 |
| Plasticizer | 65 |

These materials were then poured onto the rolls of a standard two-roll rubber mill, with 6 inch x 12 inch rolls which were heated to a temperature of 170° C., and set for a sheet thickness of approximately 0.025 inch. The mixture fluxed readily and formed a clear mix on the mill rolls within a short time. After the sheet began to form, milling was continued with constant working and cutting for a period of five minutes, after which the plasticized resin was removed from the mill in the form of a sheet approximately 0.025 inch thickness.

Sixty-five grams of the plastic were cut from the milled sheet and placed in a chrome plated flat mold, with a cavity of size 6 inches x 6 inches x 0.075 inch, and which had been previously heated to a temperature of 177° C. The mold was then replaced between the heated platens of a hydraulic press, which were heated to 177° C. The press was closed and the mold and its contents heated, without any pressure on the mold, to allow the plastic to melt and allowing it to flow readily. After two minutes under these conditions the pressure on the mold was increased to 450 pounds per square inch and again held for two minutes. Finally the pressure was increased to 1500 pounds per square inch and held for four minutes at this pressure. The slight excess of plastic was squeezed from the mold under this pressure and a completely filled mold was assured.

The plastic specimen and the mold were then cooled to below 50° C. by circulating cooling water through the platens of the press. After releasing the pressure the plastic specimen was removed from the mold as a clear and uniform sheet. In a like manner and employing a similar mold, a sheet 6 inches x 6 inches x 0.020 inch was pressed. 25 grams of the milled sheet were loaded into the mold, then it was placed in the press and held at 177° C. under 450 pounds per square inch pressure for 2 minutes and followed by 1500 pounds per square inch for 4 minutes. The platens and mold were cooled and the material removed from the press in the form of a clear and uniform sheet of plastic.

In the manner described, and employing the formula discussed previously, sheets were milled from each of the plasticizers (Examples I through XXII) and at three plasticizer concentration levels, 55 phr., 65 phr., and 75 phr., respectively. From each formulation a sheet of 0.075 inch thickness and one of 0.020 inch thickness were prepared for use in evaluation tests.

Employing the method of the American Society for Testing Materials (ASTM) Procedure No. D-412-51T, and which has become a standard published procedure of the vinyl industry, the tensile modulus was determined for each plastic sample. The tensile modulus, defined as that tensile force required to produce a 100% elongation or increase in the length of test specimen, is a measure of the flexibility of a plastic, lower values indicating that the plastic can be readily stretched, while higher values indicate that the plastic is not so soft or flexible. The concentration of plasticizer (expresed as phr.) required to obtain a tensile modulus of approximately 1300 p.s.i. has been defined as its efficiency concentration. This value, which shows the relative amount of each plasticizer that is required to produce the same degree of plasticity in the resin, has been chosen since it is within the range of moduli within which falls a large proportion of the materials, sheeting, and fabrics prepared from plasticized polyvinyl chlorides. The efficiency concentration for the various plasticizers of Examples I-XXII is shown in Table III.

TABLE III

| Example No. | Mole Percent Aromatic Dibasic Acid | Efficiency Concentration Modulus 1300 p.s.i. |
|---|---|---|
| I | 0 | 61 |
| II | 5 | 61 |
| III | 20 | 68 |
| IV | 35 | 72 |
| V | 50 | 77 |
| VI | 20 | 70 |
| VII | 20 | 73 |
| VIII | 20 | 68 |
| IX | 35 | 72 |
| X | 0 | 60 |
| XI | 5 | 62 |
| XII | 20 | 68 |
| XIII | 33 | 75 |
| XIV | 50 | 87 |
| XV | 5 | 59 |
| XVI | 25 | 67 |
| XVII | 50 | 72 |
| XVIII | 75 | 83 |
| XIX | 50 | 71 |
| XX | 50 | 74 |
| XXI | 50 | 75 |
| XXII | 50 | 72 |

Those plasticizers having an efficiency concentration value above 75 have little utility in the polyvinyl field. From the data given in Table III above it can be seen that those plasticizers which contain as much as 75 mole percent of the aromatic dibasic acid component fall well outside the useful range in this, as well as other respects.

The factors of permanence and compatibility attributable to the use of the plasticizers of this invention can be demonstrated by testing plasticized PVC sheets for their resistance to extraction of the plasticizer by soapy-water and by oil. In carrying out these tests, circular test specimens, 2.5 inches in diameter, are cut in duplicate from the pressed sheet of 0.020 inch thickness using a die in a hand operated press. For the soap extraction tests, the duplicate weighed specimens were suspended in a one percent aqueous soap solution (Ivory soap) in a pint jar and held at 50° C. for 24 hrs. The samples were removed, washed with distilled water, then dried for 3 hours at 50° C. The specimens were reweighed and the loss was calculated as percent loss of the original weight. Oil extraction tests were run by suspending the duplicate weighed specimens in mineral oil (Atreol No. 9, a product of Atlantic Refining Co.) at 25° C. for 24 hours. The samples were removed, excess oil was wiped off, and then dried for 3 hours at 50° C. Again the sample weight and the amount of plasticizer lost was determined. The loss was calculated as percent loss of the original specimen.

As in the previous evaluations, the soapy-water and mineral oil extractions were determined on specimens made from all plasticizers. The results are tabulated below in Tables IV and V.

TABLE IV

| Example No. | Mole Percent Aromatic Dibasic Acid | Soapy Water, Percent Extracted at 90 phr. | Mineral Oil, Percent Extracted at 90 phr. |
|---|---|---|---|
| I | 0 | 2.18 | 1.37 |
| II | 5 | 0.49 | 0.90 |
| III | 20 | 0.90 | 0.72 |
| IV | 35 | 0.55 | 0.34 |
| V | 50 | 0.43 | 0.10 |
| VI | 20 | 0.34 | 0.34 |
| VII | 20 | [1] 2.21 | 0.48 |
| VIII | 20 | 1.00 | 0.89 |
| IX | 35 | 0.28 | 0.45 |
| X | 0 | 1.89 | 1.07 |
| XI | 5 | 0.57 | 0.30 |
| XII | 20 | 0.36 | 0.10 |
| XIII | 33 | [2] 1.71 | 0.13 |
| XIV | 50 | 0.28 | +0.25 |

[1] Adipicpolymers have a relatively high functionality due to their shorter chain length. For this reason, they suffer greater losses in soapy water tests than do polymers prepared with azelaic acid.
[2] This high extraction value is explained by the fact that the acid value of plasticizer XIII was slightly in excess of 4, this high acidity offering a point of attack for the alkali in the soap.

From the above results it will be seen that outstanding benefit from the extraction standpoint is obtained by using polymers containing as little as 5 mole percent of the aromatic dibasic acid component. This is particularly the case with the data of Table IV.

TABLE V

| Example No. | Mole, Percent Aromatic Dibasic Acid | Soapy Water, Percent, Extracted at— | | Mineral Oil, Percent, Extracted at— | |
|---|---|---|---|---|---|
| | | 55 phr. | 75 phr. | 55 phr. | 75 phr. |
| Blank | [1] 0 | 3.38 | 5.0 | 0.62 | 1.79 |
| XV | 5 | 3.11 | 5.05 | 0.57 | 1.41 |
| XVI | 25 | 2.41 | 4.22 | [2] 0.74 | 1.19 |
| XVII | 50 | 1.30 | 1.90 | 0.21 | 0.53 |
| XVIII | 75 | 0.53 | 0.80 | 0.11 | 0.24 |
| XIX | 50 | 0.44 | 0.62 | 0.27 | 0.67 |
| XX | 50 | 0.48 | 0.71 | 0.11 | 0.26 |
| XXI | 50 | 0.86 | 1.40 | 0.15 | 0.38 |
| XXII | 50 | 0.50 | 0.80 | 0.27 | 0.62 |

[1] Plasticizer prepared using 3 moles of adipic acid only.
[2] Questionable reading.

One of the most remarkable improvements in the performance of a PVC resin plasticized with the compositions hereof lies in its electrical resistance properties. Polyvinyl chloride itself is known to have excellent electrical resistance. However, the plasticizers that are now commonly used therein are extremely poor in electrical resistance and effect a severe reduction in the resistance of the resulting plasticized resin. In Table VI given below, the products of Examples I and X (and the "Blank"), which were prepared only from the aliphatic dibasic acid rather than from a mixture of aliphatic acid and aromatic dibasic acids, give performance values which are typical of those of the plasticizers now available to the industry. As will be seen from the data of the table, greatly improved electrical resistance properties are obtained as amounts of the aromatic acid component in excess of 5 mole percent are employed in formulating the plasticizer.

The improvement in electrical resistance properties effected by use of the plasticizers of this invention can be illustrated by preparing a plasticizer-resin formulation having the following composition:

| | Grams |
|---|---|
| PVC resin (Geon 101) | 100 |
| Plasticizer | 67 |
| Burgess Pigment No. 30 (a clay filler) | 7 |
| Dythal (a dibasic lead phthalate stabilizer marketed by National Lead Co.) | 10 |

The above materials were milled for 5 minutes on a standard 6 x 12 inch, 2-roll rubber mill at 170° C. in the same manner as previously described herein, then removed from the mill as a sheet of approximately 0.030 inch in thickness. A circular sheet 8 inches in diameter and 0.050 inch in thickness was prepared by pressing in a mold at 177° C. for 2 minutes with no pressure, 2 minutes at 450 pounds per square inch and finally 4 minutes at 1500 pounds per square inch. The press and mold were cooled and the pressed sheet removed. Circular test specimens of this same size were prepared in the same manner (and using the same general formulation) from all plasticizers, Examples I through XXII. Using these test specimens, the volume resistivity of each specimen was measured at 90° C., using the equipment of the standard method of the American Society for Testing Materials, Method No. D–257–58. The volume resistivity at 90° C. of each specimen is recorded below:

TABLE VI

| Example No. | Mole, Percent Aromatic Dibasic Acid | Volume Resistivity in Ohm Centimeter |
|---|---|---|
| I | 0 | 5.0×10$^{12}$ |
| II | 5 | 6.6×10$^{12}$ |
| III | 20 | [1] 4.95×10$^{12}$ |
| IV | 35 | 13.6×10$^{12}$ |
| V | 50 | 14.9×10$^{12}$ |
| VI | 20 | 7.8×10$^{12}$ |
| VII | 20 | 18.0×10$^{12}$ |
| VIII | 20 | [1] 2.9×10$^{12}$ |
| IX | 35 | 14.7×10$^{12}$ |
| X | 0 | 3.1×10$^{12}$ |
| XI | 5 | 5.9×10$^{12}$ |
| XII | 20 | 12.8×10$^{12}$ |
| XIII | 33 | 4.2×10$^{12}$ |
| XIV | 50 | 36.3×10$^{12}$ |
| Blank [2] | 0 | 1.80×10$^{12}$ |
| XV | 5 | 1.97×10$^{12}$ |
| XVI | 25 | 3.29×10$^{12}$ |
| XVII | 50 | 9.5×10$^{12}$ |
| XVIII | 75 | 15.5×10$^{12}$ |
| XIX | 50 | 12.2×10$^{12}$ |
| XX | 50 | [3] 2.42×10$^{12}$ |
| XXI | 50 | [3] 1.98×10$^{12}$ |
| XXII | 50 | 9.5×10$^{12}$ |

[1] These values are questionable, the unduly low readings being attributable to poor contacts.
[2] Plasticizer prepared using 3 moles of adipic acid only.
[3] Isophthalic acid samples used in preparation of plasticizer contained iron as an impurity which acts to increase conductivity and thus mask the true effect of the plasticizer.

EXAMPLES XXIII–XXVII

A series of polyester plasticizers representing an embodiment of the present invention was prepared under conditions identical with those taught above in connection with Examples I–XXII. In each of these preparations there was employed:

| | Moles |
|---|---|
| Phthalic anhydride | 1 |
| Azelaic acid | 2 |
| Myristic acid | 2 |
| Glycol (25% excess) | 5 |

The composition of the several polyesters so prepared is given in the Table VII provided below, the following abbreviations being used:

Az=azelaic acid
PA=phthalic anhydride
Myr=myristic acid
NPG=neopentyl glycol
PG=propylene glycol
BD=1,4-butanediol
HD=1,6-hexanediol The numbers following the abbreviations give the number of moles of the particular compound employed. The excess mole of glycol employed in each instance is set forth separately, this mole being theoretically distilled from the polyester during the course of the preparatory reaction.

Examples XXIII, XXIV and XXV illustrate the invention, while Examples XXVI and XXVII present comparative data as regards compositions which fall outside the scope of this invention.

Tests were made to determine (1) the conductivity (volume resistivity) of each of these polyester plasticizers and, (2) the conductivity of plasticized polyvinyl chloride sheets formed from each of said polyesters. The data so obtained are also given in Table VIII. The plasticized polyvinyl sheets were prepared in exact conformity to the method taught above in connection with Examples I–XXII. The volume resistivity of the plasticizers, per se, was measured by placing the (liquified) plasticizer, heated to 90° C. or 25° C. in a 600 ml. beaker. A pair of Monel metal electrodes measuring approximately 38 mm. x 38.5 mm. and mounted 13.0 mm. apart were lowered into the plasticizer and a 500 volt electrical current was applied across the electrodes. The resistance was measured with a megohm bridge (Type 544-B General Radio Corporation), the volume resistivity being calculated by the formula $$\text{Volume Resistivity (ohm-cm.)} = \frac{A}{dR}$$

where $R$=resistance in ohms, $A$=area of face of an electrode in cm.$^2$ and $d$=distance between electrodes in cm.

TABLE VII

| | Example No. | | | | |
|---|---|---|---|---|---|
| | XXIII | XXIV | XXV | XXVI | XXVII |
| Composition | Az, 2<br>PA, 1<br>Myr, 2<br>NPG, 4 | Az, 2<br>PA, 1<br>Myr, 2<br>NPG, 3.6<br>PG, 0.4 | Az, 2<br>PA, 1<br>Myr, 2<br>NPG, 2<br>PG, 2 | Az, 2<br>PA, 1<br>Myr, 2<br>PG, 2<br>BD, 2 | Az, 2<br>PA, 1<br>Myr, 2<br>PG, 2<br>HD, 2 |
| Excess Glycol (1 mol) | NPG | PG | PG | PG | PG |
| Molecular Wt | 1,244 | 1,233 | 1,188 | 1,160 | 1,240 |
| Physical State (25° C.) | Liquid | Liquid | Liquid | Solid | Solid |
| Volume Resistivity of Polyester (ohm-cm.): [1] | | | | Could Not Measure (Solid) | |
| 25° C | 3.62 | 3.72 | 2.02 | | |
| 90° C | 1.52 | 1.31 | 1.05 | 0.69 | 0.69 |
| Volume Resistivity of Plasticized (67 phr.) PVC (ohm-cm.): [2] 90° C | 13.88 | 11.4 | 6.8 | 0.142 | 0.79 |

[1] Value should be multiplied by $10^9$.
[2] Value should be multiplied by $10^{12}$.

The data presented in the foregoing table clearly establish the superiority of the polyester plasticizers using neopentyl glycol. The reference plasticizers (XXVI and XXVII which contain no neopentyl glycol) are poor in electrical insulating qualities and are solids at room temperature. The latter quality makes them much more difficult to handle and compound for production of plasticized polyvinyl chloride resins.

EXAMPLE XXVIII

In this operation, a polyester plasticizer representing an embodiment of the present invention was prepared in accordance with the method taught above in connection with Examples I-XXII, but using a reaction mixture having the following composition, where $x$ in the general formula given above has an empirical value of 12:

| | Parts |
|---|---|
| Phthalic anhydride (2.9 moles) | 16 |
| Azelaic acid (9.1 moles) | 64 |
| Propylene glycol (4.2 moles) | 18 |
| Neopentyl glycol (10.8 moles) | 45 |
| Dibutyl tin oxide catalyst | 0.04 |
| Commercial stearic acid (2 moles) | 20 |

This acid component was made up of approximately equal parts of palmitic and stearic acids.

The product so obtained had a molecular weight of approximately 3500 and a viscosity of 227 cs. at 210° F. When compounded with polyvinyl chloride resin in the same manner as described above in connection with Examples I-XXII, it was found that the plasticizer had an efficiency concentration of 70 and that the resin had a hardness of 77 at 70 phr. The plasticized PVC product had a soapy-water extraction loss (1 day at 50° C.) of 1.16% and an oil extraction loss (1 day at 25° C.) of 0.27, both as determined at 70 phr. The product, had a volume resistivity of $10.2 \times 10^{12}$ ohm-centimeters at 70 phr.

The plasticizers of this invention have the ability to improve the qualities of polyvinyl chloride resins when incorporated therein at levels of at least 5 phr. These plasticizers are compatible not only with the resin, but also with other types of plasticizers which may be used in conjunction therewith.

When reference is made herein to formulations incorporating various "parts" of the respective reactants, the parts are calculated on a weight basis.

We claim:
1. A linear polymeric polyester plasticizing composition having a molecular weight of from about 700 to 5000 which is prepared by esterifying a reaction mixture comprising the following ingredients:
   (a) a glycol component consisting of neopentyl glycol and optionally at least one other glycol selected from the group consisting of ethylene glycol, propylene glycol and 1,3-butanediol, the amount of neopentyl glycol present being equivalent to at least 50% of that required to esterify all the acids in the mixture;
   (b) an aliphatic monocarboxylic acid component comprised of alkanoic acids of from 7 to 18 carbon atoms in the molecule;
   (c) an aliphatic dicarboxylic acid component comprised of alkanedioic acids containing from 6 to 13 carbon atoms in the molecule; and
   (d) an aromatic dicarboxylic acid component selected from the group consisting of phthalic, isophthalic and terephthalic acids and of the anhydrides of said acids, said aromatic acid comprising from 5 to 60 mole percent of the total dicarboxylic acid content of the reaction mixture;
the above reactants being employed in the ratio of 2 moles of the monocarboxylic acid component to from about 2 to 15 moles of the total aliphatic and aromatic dicarboxylic acid component, and to a number of moles of the glycol component at least equal to one more than the total number of moles of the dicarboxylic acid component.

2. A plasticizer as set forth in claim 1 wherein the aliphatic dicarboxylic acid is adipic acid and wherein the aromatic dicarboxylic acid comprises phthalic anhydride.

3. A plasticizer as set forth in claim 1 wherein the aliphatic dicarboxylic acid is azelaic acid and wherein the aromatic dicarboxylic acid comprises phthalic anhydride.

4. A plasticizer as set forth in claim 1 wherein the aliphatic monocarboxylic acid comprises pelargonic acid, wherein the aliphatic dicarboxylic acid is adipic acid and wherein the aromatic dicarboxylic acid comprises phthalic anhydride.

5. A plasticizer as set forth in claim 1 wherein the aliphatic monocarboxylic acid comprises pelargonic acid, wherein the aliphatic dicarboxylic acid is azelaic acid and wherein the aromatic dicarboxylic acid comprises phthalic anhydride.

6. A plasticized polyvinyl chloride composition containing incorporated therein at least 5 phr. of a linear polyester composition having a molecular weight of from about 700 to 5000 which is prepared by esterifying a reaction mixture comprising the following ingredients:

(a) a glycol components consisting of neopentyl glycol and optionally at least one other glycol selected from the group consisting of ethylene glycol, propylene glycol and 1,3-butanediol, the amount of neopentyl glycol present being equivalent to at least 50% of that required to esterify all the acids in the mixture;

(b) an aliphatic monocarboxylic acid component comprised of alkanoic acids of from 7 to 18 carbon atoms in the molecule;

(c) an aliphatic dicarboxylic acid component comprised of alkanedioic acids containing from 6 to 13 carbon atoms in the molecule; and (d) an aromatic dicarboxylic acid component selected from the group consisting of phthalic, isophthalic and terephthalic acids and of the anhydrides of said acids, said aromatic acid comprising from 5 to 60 mole percent of the total dicarboxylic acid content of the reaction mixture;

the above reactants being employed in the ratio of 2 moles of the monocarboxylic acid component to form about 2 to 15 moles of the total aliphatic and aromatic dicarboxylic acid component, and to a number of moles of the glycol component at least equal to one more than the total number of moles of the dicarboxylic acid component.

References Cited

UNITED STATES PATENTS

| | | | |
|---|---|---|---|
| 2,815,354 | 12/1957 | Wilkinson et al. | 260—23 XR |
| 2,823,156 | 2/1958 | Hedges | 260—23 XR |
| 2,838,428 | 6/1958 | Bohrer | 260—23 XR |
| 2,951,052 | 8/1960 | Darby | 260—23 XR |
| 3,039,979 | 6/1962 | Carlick et al. | 260—76 |
| 3,055,869 | 9/1962 | Wilson et al. | 260—22 |
| 3,194,776 | 7/1965 | Caldwell | 260—31.8 |

FOREIGN PATENTS

| | | |
|---|---|---|
| 844,310 | 8/1960 | Great Britain. |

DONALD E. CZAJA, *Primary Examiner.*

LEON J. BERCOVITZ, *Examiner.*

R. W. GRIFFIN, *Assistant Examiner.*